United States Patent [19]

Kaaden et al.

[11] Patent Number: 5,253,130
[45] Date of Patent: Oct. 12, 1993

[54] HEAD TRACK ALIGNMENT ARRANGEMENT IN A MAGNETIC TAPE RECORDER

[75] Inventors: Jürgen Kaaden; Franz Bigge, both of Villingen, Fed. Rep. of Germany; Paul A. Gillot, Fran Fontainebleau, France

[73] Assignee: Deutsche Thomson-Brandt GmbH, Villingen, Fed. Rep. of Germany

[21] Appl. No.: 692,390

[22] Filed: Apr. 25, 1991

[30] Foreign Application Priority Data

Dec. 2, 1988 [DE] Fed. Rep. of Germany ....... 3840630

[51] Int. Cl.⁵ .............................................. G11B 5/58
[52] U.S. Cl. .............................. 360/77.15; 360/77.04; 360/77.14
[58] Field of Search ................... 360/77.14, 75, 77.13, 360/77.15, 77.16

[56] References Cited

U.S. PATENT DOCUMENTS

| | | | |
|---|---|---|---|
| 4,470,079 | 9/1984 | Tsuruta | 360/77.13 |
| 4,587,580 | 5/1986 | Takayama et al. | 360/77.14 |
| 4,656,539 | 4/1987 | Sugiki et al. | 360/77.15 |
| 4,675,759 | 6/1987 | Strand | 360/75 |
| 4,816,930 | 3/1989 | Kubo et al. | 360/10.2 |
| 4,868,692 | 1/1989 | Nakase et al. | 360/77.16 |
| 4,984,104 | 1/1991 | Takahashi et al. | 360/77.14 |
| 5,055,952 | 10/1991 | Noh | 360/77.14 |

FOREIGN PATENT DOCUMENTS 0117753 9/1989 European Pat. Off. .
61-265764 11/1986 Japan .

OTHER PUBLICATIONS

IEEE Transactions on Consumer Electronics, vol. CE32, #3, (Aug. 1986) pp. 426.431.

*Primary Examiner*—John S. Heyman
*Attorney, Agent, or Firm*—Joseph S. Tripoli; Sammy S. Henig

[57] ABSTRACT

In a calibration operation mode of a magnetic tape recorder for helical track recording, employing the R-DAT standard, a first magnitude of a pilot signal reproduced in a first magnetic head from a pilot signal recorded in a center track with respect to the first magnetic head is obtained. A second magnitude of a pilot signal reproduced in a second magnetic head from a pilot signal recorded in a center track with respect to the second magnetic head is also obtained. A ratio between the first and second magnitudes is calculated and stored prior to normal playback mode of operation. During normal playback mode of operation, the stored ratio is used for normalizing a first difference signal, between crosstalk pilot signals that are reproduced in one of the first and second magnetic heads relative to a second difference signal, between crosstalk pilot signals that are reproduced in the other one of the first and second magnetic heads. The first and second difference signals are applied to a capstan motor for reducing a head-track misalignment error.

22 Claims, 3 Drawing Sheets

HEAD TRACK ALIGNMENT ARRANGEMENT IN A MAGNETIC TAPE RECORDER

This application is a continuation of an international application, PCT/EP, filed Nov. 28, 1989, Ser. No. 89/01445, designating the United States and claiming priority from a German Patent Application filed Dec. 2, 1988, Ser. No. P 38 40 630.6.

The invention relates to a track control arrangement in a magnetic tape recorder.

In a well known magnetic tape recorder arrangement tracks are recorded without guard bands between adjacent tracks. Head-track alignment of the magnetic head with respect to the tracks is important. Head-track alignment is important in order to reduce signal crosstalk from signals recorded in tracks that are adjacent with respect to a desired or center track traced by the head. Crosstalk could impair the reproduction of a desired signal recorded in the desired track.

Published European Patent Application No. EP 0117753, entitled, METHOD OF AND APPARATUS FOR RECORDING DIGITAL INFORMATION SIGNALS, the inventors being Omori, et al., published 9/5/89, teaches an arrangement in which pilot signals are recorded in one of several track segments for automatic track alignment during the reading or reproduction process. These pilot signals are recorded in tracks adjacent to each other. During playback, a correcting variable can be obtained by evaluating the pilot signals. This correcting variable indicates how much and in which direction the magnetic head deviates from the desired track. This variable is utilized to align the head with the desired track by controlling a phase of a headwheel or of a capstan motor that controls a forward movement of the tape.

In a recently developed R-DAT system for recording digital audio on a magnetic tape, the tracks lie adjacent each other without any guard band or separating distance. The gap of each of the magnetic heads of the headwheel is larger than the width of the desired track so that when the head is positioned over the desired track, the neighboring or adjacent tracks at both sides of the desired track are also overlapped by portions of the gap of the magnetic head. Crosstalk of signal reproduced from the neighboring tracks with respect to the desired signal is undesirable and prevented by having the working gaps of the two heads inclined in opposite directions relative to each other. Crosstalk of reproduced pilot signals recorded in the neighboring tracks is desirable and utilized for track-head alignment control, as illustrated in FIGS. 1a and b.

In the example of FIG. 1a, recorded pilot signals A, B, C and D having, for example, the same frequency, are recorded in tracks 3, 2, 1 and 0, respectively, of a tape 4 in corresponding segments having equal lengths but offset or staggered relative to one another.

A headwheel, not shown, carries magnetic heads 5 and 5', in a well known manner. When magnetic head 5, for example, traces or scans track 2, referred to as the center track with respect to head 5, head 5 produces from recorded pilot signals A and B in adjacent tracks 1 and 3, respectively, corresponding output crosstalk signals having amplitudes a and b, respectively. When head 5 and track 2 are in a correct or just head-track alignment, amplitudes a and b are nominally equal. Head 5 produces from recorded pilot signal C, recorded in the center or desired track 2, an output signal having an amplitude c that is substantially larger than each of amplitudes a and b.

Head-track misalignment in which the position of head 5 deviates in the direction of track 1 will cause amplitude b to increase and amplitude a to decrease. Conversely, a deviation of head 5 in the direction of track 3 will cause amplitude a to increase and amplitude b to decrease. A difference between amplitudes a and b may be used, in a well known manner, to produce a feedback signal that is applied to a control circuit. The control circuit controls the position of the track relative to the head in a manner to provide correct head-track alignment. Alignment of the head relative to the desired track is accomplished by controlling the phase of, for example, a capstan motor, referred to as phase regulation. The capstan motor controls the movement of the tape.

In practice, because of differences between heads 5 and 5', for example, an amplitude of a pilot signal reproduced by head 5 may not be equal to that of a corresponding pilot signal that is reproduced by head 5'. For example, the amplitude of the reproduced pilot signal in head 5 that is recorded in adjacent track 1 with respect to head 5 is not equal to that recorded in adjacent track 0 with respect to head 5' and reproduced in head 5'. To provide correct tracking alignment, it may be desirable to compensate for a difference between the amplitude of the crosstalk output signals reproduced in head 5 and the corresponding ones reproduced in head 5'.

It is known to adjust the amplitudes of pilot signals that are reproduced in head 5 relative to those reproduced in head 5' using a potentiometer such that the amplitudes associated with head 5 are equal to the corresponding amplitudes associated with head 5'. The adjustment of the amplitudes is, typically, accomplished in the factory using a test cassette in which pilot signals are recorded at the same level in all tracks. Disadvantageously, such operation is time consuming and may require expensive test equipment. Furthermore, because of a host of factors that occur in the course of user operation, such as head wear, contamination and asymmetry during recording, the initial adjustment in the factory may no longer be correct. The result is that without readjustment in, for example, a workshop or a factory, head-track alignment may be defective, leading to a faulty reproduction of the desired or user information signal.

It may be desirable to compensate for the aforementioned difference between the amplitudes of the reproduced pilot signals in the two heads without the need for adjustment or readjustment in the manufacturing process or in the workshop.

A magnetic tape recorder, embodying an aspect of the invention, includes a magnetic tape having a plurality of recording tracks in which a pilot signal is recorded. Each of the tracks is slanted with respect to a length direction of the tape. An arrangement, including a first magnetic head, is used for reproducing, via the first magnetic head, the pilot signal that is recorded in adjacent tracks with respect to the first magnetic head to produce a first crosstalk signal. An arrangement, including a second magnetic head, is used for reproducing, via the second magnetic head, the pilot signal that is recorded in adjacent tracks with respect to the second magnetic head to produce a second crosstalk signal. Prior to a normal playback mode of operation, a third signal containing a first corrective value that is indicative of a difference between a signal reproduced via the first magnetic head and a signal reproduced via the second magnetic head is stored. First and second portions of an output signal that is indicative of a head-track misalignment error are generated, during normal playback mode of operation. The first portion of the output signal is compensated, in accordance with the first corrective value, relative to the second portion of the output signal. A head-track misalignment is controlled in response to the output signal in a manner to reduce the error.

FIG. 1b illustrates waveforms of the reproduced pilot signals recorded in the tape of FIG. 1a;

Figure 1A:
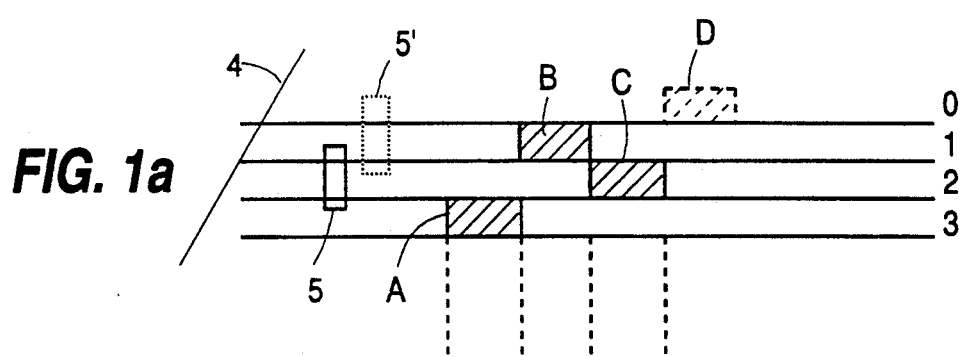
FIG. 1a illustrates the way pilot signals are recorded in a magnetic tape in the R-DAT standard system.
Figure 1B:
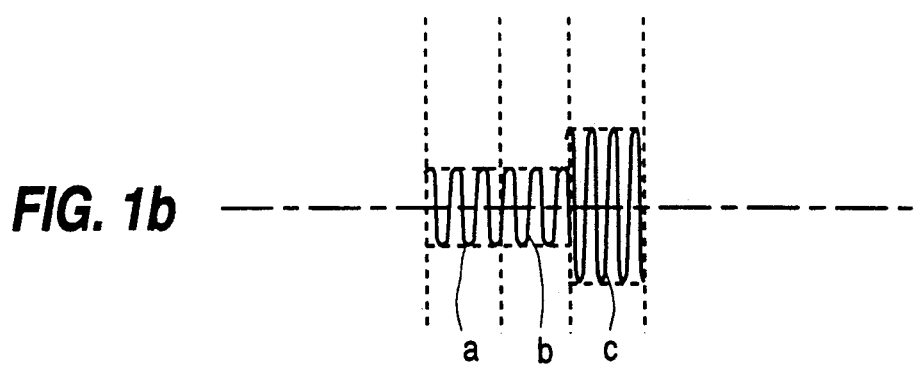
Figure 2:
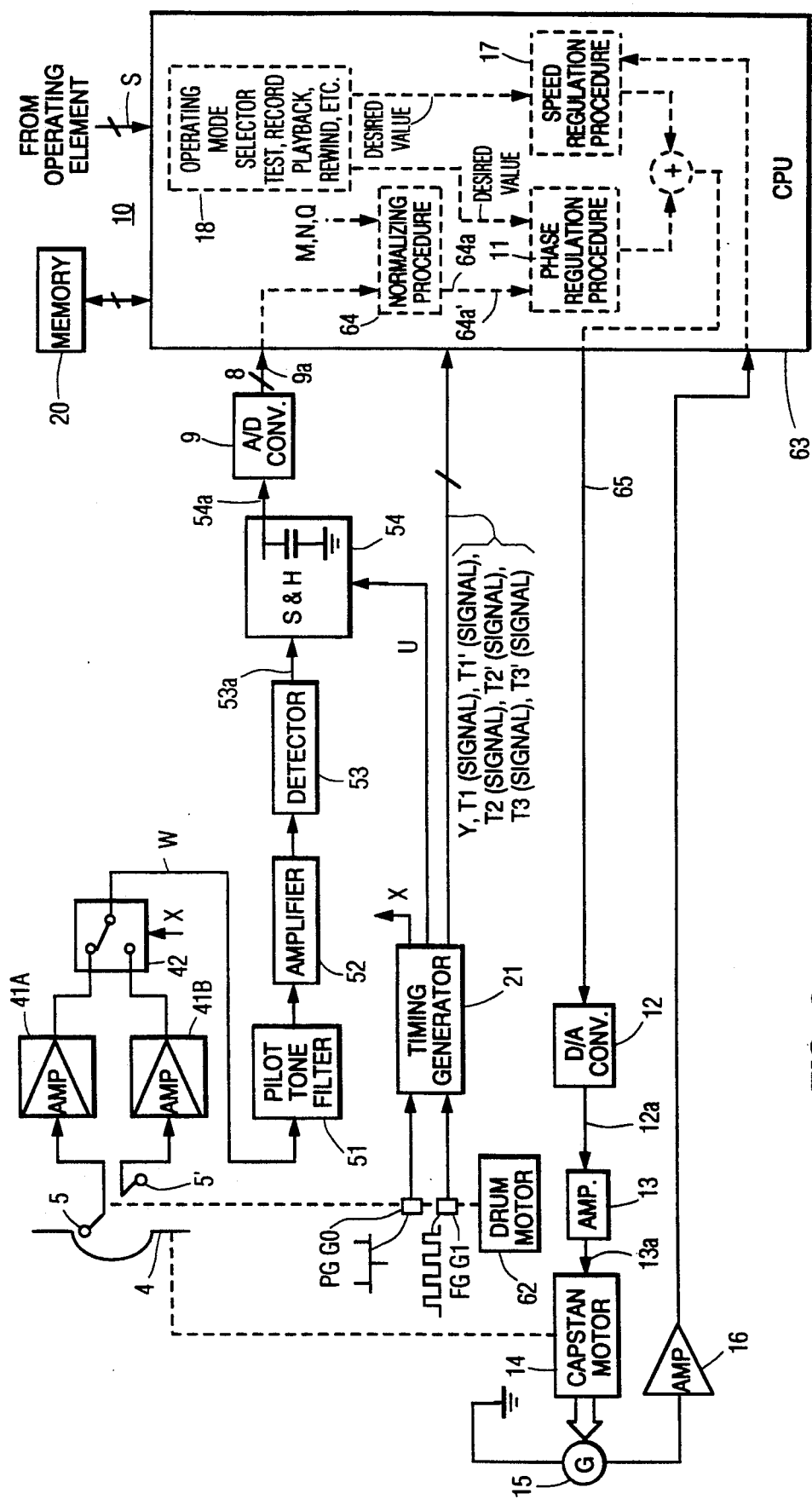
FIG. 2 illustrates a block diagram of a head-track alignment control arrangement, embodying an aspect of the invention.

FIG. 2 illustrates, in a simplified block diagram, a head-track alignment control arrangement, embodying an aspect of the invention, of a magnetic tape recorder utilizing the aforementioned R-DAT system. FIGS. 3a-3k illustrate waveforms useful for explaining the operation of the arrangement of FIG. 2. Similar symbols and numerals in FIGS. 1a, 1b, 2 and 3a-3k indicate similar items or functions.

Referring to FIG. 2, signals reproduced from tape 4 by rotary heads 5 and 5' are coupled through head amplifiers 41A and 41B, respectively, to a conventional head switching circuit 42. Switching circuit 42 is controlled to be alternately changed over in position in response to a head switching signal X of FIG. 3b produced by a timing signal generator 21 of a servo circuit of the headwheel at every half-rotational period including the tape contact periods of rotary heads 5 or 5' of FIG. 2. Accordingly, an output signal W is produced by switching circuit 42. Timing signal generator 21 of FIG. 2 produces corresponding timing signals that are shown in FIGS. 3b, 3c and 3e-3k in a conventional manner from signals produced by a frequency generator and a phase generator of a servo control circuit, not shown, associated with a drum motor 62 that rotates the headwheel carrying heads 5 and 5'.

Figure 3:
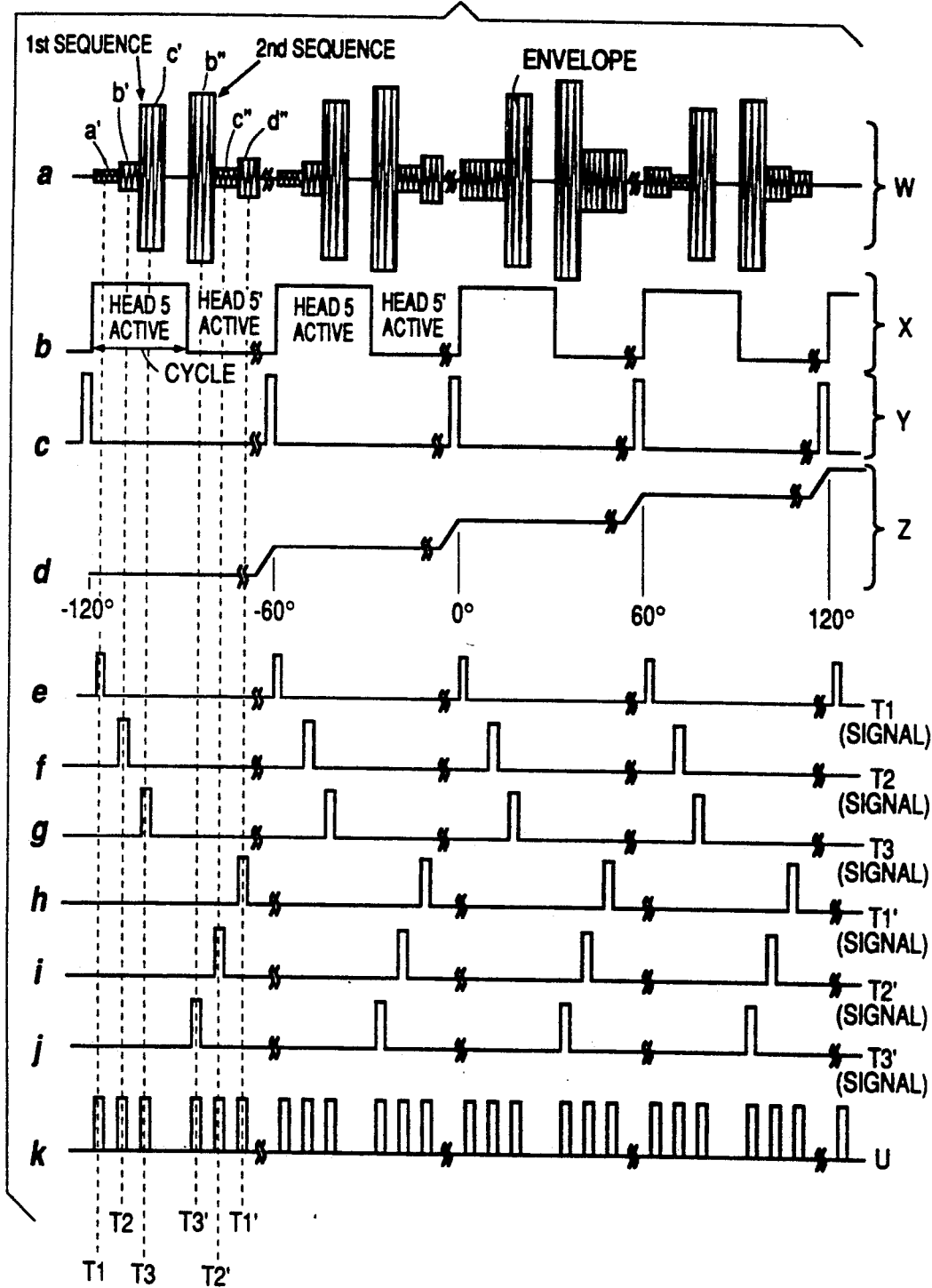
FIGS. 3a-3k illustrate waveforms useful for explaining the operation of the arrangement of FIG. 2.

Signal W is coupled via a conventional pilot tone filter 51 and an amplifier 52 to an envelope detector 53 that produces a rectified signal 53a in accordance with a peak or envelope of signal W. Signal 53a is coupled to a sample-and-hold stage 54 that samples signal 53a when a signal U occurs. Signal U produced by timing signal generator 21 represents times when pilot signal W of FIG. 3a are valid.

An output signal 54a of stage 54 is coupled to an input terminal of an analog-to-digital (A/D) converter 9 that produces digital words 9a. Each Word 9a contains a value of the envelope of signal W when signal U is produced. Thus, for example, three consecutively produced words 9a in a first sequence are indicative of amplitudes a', b' and c', respectively, of FIG. 3a.

A microprocessor 10, that includes a central processing unit (CPU) 63 and a memory 20, produces an output word 65 that is coupled to a digital-to-analog (D/A) converter 12 for producing an analog signal 12a that is amplified in an amplifier 13. An output signal 13a of amplifier 13 controls the speed and/or phase of a capstan motor 14 that causes the movement of tape 4. A frequency generator 15 coupled to motor 14 produces a feedback signal, representative of the speed of motor 14, that is coupled via an amplifier 16 to an input terminal of microprocessor 10. Microprocessor 10 controls a phase of capstan motor 14 with respect to the headwheel by varying word 65 in a manner that provides head-track alignment.

In FIGS. 3a-3k, four examples are shown, for illustration purpose only. In the four examples of FIGS. 3a-3k, the tape feed or capstan phase Z of motor 14 of FIG. 2 changes to becoming −60, 0°, +60° and 120°, respectively, as a result of corresponding changes in word 65. A phase Z of 0° is referred to a situation in which, for example, head 5, of FIG. 1a, is aligned or centered with, for example, desired track 2. A phase Z of + or − 180° refers to a head-track misalignment error in which head 5 is aligned, instead, with adjacent track 1 or 3.

FIG. 3a illustrates a waveform of amplitudes a', b' and c', produced by head 5, of a first sequence of the reproduced pilot signals from tracks 3, 2 and 1, respectively, of FIG. 1a. The corresponding three words 9a of FIG. 2 are produced and stored in memory 20, at times T1, T2, and T3 of FIGS. 3e, 3f and 3g, respectively. Amplitude c', for example, is obtained from the reproduced pilot signal C recorded in the center track.

Similarly, FIG. 3a illustrates a waveform of amplitudes b", c" and d", produced in head 5', of a second sequence of the reproduced pilot signals recorded in tracks 1, 2 and 0, respectively, of FIG. 1a. The corresponding three words 9a of FIG. 2 are stored in memory 20 at times T1', T2', and T3' of FIGS. 3h, 3i and 3j, respectively. Amplitude b' is obtained from the reproduced pilot signal B recorded in the center or desired track.

As shown in FIG. 3a, the amplitude of the crosstalk pilot signal reproduced by head 5, for example, from pilot signal A that is recorded in adjacent track 3 is different from the amplitude of the crosstalk pilot signal reproduced by head 5', for example, from pilot signal C that is recorded in adjacent track 2. Track 3 is an adjacent track with respect to head 5 and track 2 is an adjacent track with respect to head 5'. As explained before, such situation, if not compensated, is undesirable for phase control purposes of motor 14. To provide such compensation, a calibration or test mode of operation of the arrangement of FIG. 2 is utilized.

In the test mode, in accordance with an inventive feature, microprocessor 10 varies the value of output word 65, in steps, in a manner to vary the phase of capstan motor 14 also in steps. In each phase step, the phase of motor 14 is changed with respect to that at a preceding phase step.

In a given phase step of motor 14, at a given cycle of the headwheel, word 9a, containing the value of the envelope of the portion of the sequence of reproduced pilot signal W that is recorded in the center track with respect to head 5, is reproduced via a first signal path that includes head 5 and read into microprocessor 10 at time T3 of FIG. 3g. Similarly, word 9a of FIG. 2, containing the value of the envelope of reproduced pilot signal W that is recorded in the center track with respect to head 5' is reproduced via a second signal path that includes head 5' and read into microprocessor 10 at time T3' of FIG. 3j. During a predetermined number of cycles of the headwheel, in each phase step, an average value of words 9a, produced at times T3 of FIG. 3g and at times T3' of FIG. 3j is obtained. The phase step in which the average value of words 9a, produced at times T3 of FIG. 3g and of words 9a, produced at times T3' of FIG. 3j is at a maximum, is the phase of motor 14 where minimum headtrack alignment or tracking phase error occurs.

In the phase step in which the tracking phase error is at the minimum, the value of a given word 9a, produced at time T3 of FIG. 3g, for example, is divided by the value of a given word 9a, produced at time T3' of FIG. 3j to obtain a quotient or normalizing value Q that is stored in memory 20 of FIG. 2. The computation of quotient Q can be carried out for several word 9a obtained at predetermined number of cycles of heads 5 and 5' in which corresponding number of tracks are traced. Using an averaging technique, an average value of quotient or normalizing value Q can obtained and stored in memory 20.

In normal playback mode of operation, a normalizing procedure, 64, is performed in microprocessor 10. In procedure 64, quotient Q is used for multiplying a difference between a given word 9a, produced via head 5' from the corresponding crosstalk pilot signal occurring at a given time T1' of FIG. 3h, and a given word 9a, produced via head 5' of FIG. 2 from the corresponding crosstalk pilot signal occurring at a given time T2' of FIG. 3i. The result of such multiplication of the difference is a difference word 64a'. A difference word 64a is obtained by forming a difference between a given word 9a, produced via head 5 at a given time T2 of FIG. 3d and a given word 9a, produced at time T1 of FIG. 3e, via head 5 of FIG. 2. Thus, difference word 64a' associated with head 5' is normalized with respect to difference word 64a. Thus, the aforementioned difference between, for example, head 5' and 5 or between amplifiers 41A and 41B is compensated in word 64a' with respect to word 64a by the normalization operation.

The operation for obtaining each of difference word 64a and 64a' may be repeated with respect to words 9a obtained at, for example, several cycles of the headwheel. In each such cycle, each of difference words 64a and 64a' is updated to contain a running average value, using an averaging technique.

Difference words 64a and 64a' have, each, a magnitude that is indicative of a magnitude of head-track misalignment error of heads 5 and 5'. The sign of each of difference word 64a or 64a' is indicative of a direction of the misalignment. Phase control of capstan motor 14 is performed, in response to normalized words 64a and 64a' by microprocessor 10, using a well known phase regulation procedure referred to as procedure 11. Also, speed control of motor 14 is performed using a well known speed regulation procedure, 17 to form with procedure 11 a dual-loop servo of motor 14.

Thus, each of difference words 64a and 64a' is utilized in procedure 11 of FIG. 2 to vary word 65 that is applied to capstan motor 14 in a manner to control the phase-lock-loop of the dual loop servo of motor 14. The phase-lock-loop acts in a manner to reduce each of difference words 64a and 64a' to zero. At a given cycle of the head 5 and 5', when difference word 64a or 64a' is zero, each of heads 5 and 5' extends over into the tracks adjacent to the center track by equal amounts such that the center of a gap of each head is coincident with a middle of the center track that is traced or scanned. Instead of using words 64a and 64a', individually, to vary word 65, an average value of words 64a and 64a' may be obtained and used for varying word 65.

In carrying out an aspect of the invention, for a given magnetic tape recorder device, normalizing value Q may be measured and stored in memory 20 in the factory. Memory 20 may be energized continuously by a battery, not shown, even when operating power to the tape recorder is turned off. In this way, value Q is available for usage in the normal playback mode of operation.

In carrying out another aspect of the invention, normalizing value Q may be obtained and stored in memory 20, during user operation. The user inserts a prerecorded test cassette that is used, for example, for calibration purposes. A dedicated switching state of an operation mode selector of the tape recorder is activated by the user and used to initiate the calibration mode operation via mode control lines S of FIG. 2.

In carrying out another inventive feature, the calibration mode may be repeated each time a new cassette is inserted by the user. The calibration mode operation may be activated by the user, automatically, during an interval that occurs prior to each normal playback mode operation. An advantage of such automatic calibration mode is that normalizing value Q is maintained always correct for each cassette, during normal playback mode of operation.

Automatic calibration mode may be particularly advantageous when the difference in amplitude of the pilot signals reproduced by heads 5 and 5' is due to improper level of recorded pilot signals in the user inserted cassette. Assume that due to, for example, faulty recording process, pilot signals recorded in the tracks associated with head 5 of the user's cassette have different levels relative to the corresponding pilot signals recorded in the tracks associated with head 5'. Advantageously, the automatic calibration mode operation causes word 64a' to be normalized relative to word 64a even in this situation. Therefore, head-track misalignment can be minimized even when a faulty recorded tape is utilized by the user.

Because of the automatic calibration mode operation, the time in which reproduction of the desired signal can begin is delayed. This is so because the calibration mode may take a certain amount of time until normal operation reproduction of the desired signal can begin, following each time the playback mode is switched on.

An error, sometimes referred to as a head pairing error, is a situation in which a first ratio, between, for example, amplitudes d" and b' of FIG. 3a, obtained from recorded pilot signals in tracks 0 and 1, respectively, that are adjacent tracks with respect to heads 5' and 5, respectively, is different from a second ratio, between amplitudes c" and a', obtained from recorded pilot signals in tracks 2 and 3, respectively, that are adjacent tracks with respect to heads 5' and 5, respectively. When such head pairing error situation occurs, using the normalizing value Q in procedure 11 may not provide optimal normalization.

In carrying out an inventive feature, to compensate for such head pairing error, instead of utilizing normalizing values Q obtained from pilot signals that are reproduced at times T3 of FIG. 3g and at times T3' of FIG. 3j, as explained before, normalizing values or quotients, M and N, are utilized. Values M and N are obtained, in the calibration mode operation, in the phase step, explained before, in which the tracking phase error is at the minimum.

Value M is obtained by dividing the average value of words 9a, reproduced from the corresponding crosstalk pilot signal at times T1 of FIG. 3e, with the average value of words 9a, reproduced at times T2' of FIG. 3i. Similarly, value N is obtained by dividing the average value of words 9a, reproduced at times T2 of FIG. 3f, with the average value of words 9a, reproduced at times T1' of FIG. 3h.

In a modified normalizing procedure for carrying out an inventive feature, difference word 64a' is obtained by forming a difference between a first result of multiplying value N with a value of a given word 9a, reproduced at a given time T1' of FIG. 3h, and between a second result of multiplying value M with a value of a given word 9a, reproduced at a given time T2' of FIG. 3i. In other respects, the modified normalizing procedure may be similar to procedure 11 that was described before.

It should be understood that the invention is not limited for use in digital, audio recording and playback, but can also be used in a similar way with video tape recorders.

What is claimed is:

1. A magnetic tape recorder, comprising:
   a magnetic tape having a plurality of recording tracks in which a pilot signal is recorded, each of said tracks being slanted with respect to a length direction of said tape;
   first means, including a first magnetic head, for reproducing via said first magnetic head, said pilot signal that is recorded in adjacent tracks with respect to said first magnetic head to produce a first crosstalk signal;
   second means, including a second magnetic head, for reproducing, via said second magnetic head, said pilot signal that is recorded in adjacent tracks with respect to said second magnetic head to produce a second crosstalk signal;
   means responsive to a signal produced via said first magnetic head and to a signal produced via said second magnetic head for generating a third signal prior to a normal playback mode of operation in accordance with a difference therebetween, said third signal containing a first corrective value that is determined by said difference;
   memory means for storing, prior to said normal playback mode of operation, said third signal;
   means responsive to said crosstalk signals and to said stored, third signal that is read out from said memory, for generating first and second portions of an output signal that is indicative of a head-track misalignment error, during normal playback mode of operation, such that said first portion of said output signal is compensated, in accordance with said first corrective value, relative to said second portion of said output signal; and
   means responsive to said output signal for controlling a head-track misalignment in a manner to reduce said error.

2. A magnetic tape recorder according to claim 1 further comprising, means responsive to signals reproduced via said first and second magnetic heads, respectively, for generating said third signal, prior to said normal playback mode of operation.

3. A magnetic tape recorder according to claim 2 wherein said third signal generating means generates said corrective value in accordance with a ratio between a magnitude of a signal, reproduced via said first magnetic head from said pilot signal that is recorded in a center track with respect to said first magnetic head, and a magnitude of a signal, reproduced via said second magnetic head from said pilot signal that is recorded in a center track with respect to said second magnetic head.

4. A magnetic tape recorder according to claim 1 wherein said stored third signal contains a second corrective value and wherein a third portion of said output signal is compensated in accordance with said second corrective value.

5. A magnetic tape recorder according to claim 1 wherein said first and second heads are arranged on a headwheel.

6. A magnetic tape recorder according to claim 1 wherein a portion of said output signal is generated in accordance with a difference between a pair of crosstalk signals, reproduced from first and second adjacent tracks, respectively.

7. A magnetic tape recorder according to claim 1 wherein in a given neighboring pair of said tracks said pilot signal is recorded in segments that are displaced in a longitudinal direction of said tracks.

8. A magnetic tape recorder according to claim 1 wherein said output signal is coupled to a capstan motor.

9. A magnetic tape recorder according to claim 1 wherein said third signal contains a normalizing value formed in accordance with a ratio between magnitudes of signals that are reproduced via said first and second magnetic heads.

10. A magnetic tape recorder, comprising:
    first and second magnetic heads arranged on a rotating headwheel for reproducing, in each, a corresponding information signal and a corresponding pilot signal, recorded in tracks which are slanted with respect to a longitudinal axis of a magnetic tape, said pilot signal being recorded in segments of said tracks that are displaced relative to one another in a longitudinal direction of the tracks;
    means responsive to said pilot signal that is reproduced via said first magnetic head and to said pilot signal that is reproduced via said second magnetic head for generating, prior to normal playback mode of operation, a third signal in accordance with a difference between a first sequence of said pilot signal that is reproduced via said first magnetic head and a second sequence of said pilot signal that is reproduced via said second magnetic head, said difference containing a corrective value;
    memory means for storing said third signal prior to normal playback mode of operation; and
    means for correcting a head-track misalignment error, during normal playback mode of operation, in accordance with a crosstalk signal portion of a sequence of said pilot signal that is reproduced via said first magnetic head, in accordance with a crosstalk signal portion of a sequence of said pilot signal that is reproduced via said second magnetic head and in accordance with said stored, third signal that is read out from said memory means, during said normal playback mode of operation.

11. A magnetic tape recorder according to claim 10 wherein a difference between an amplitude of said crosstalk portion of said sequence that is reproduced via one of said magnetic heads, and an amplitude of said crosstalk portion of said sequence that is reproduced via the other one of said magnetic heads, during said normal playback mode of operation, is compensated in accordance with said corrective value, during said normal playback mode of operation.

12. A magnetic tape recorder according to claim 10 wherein, in said third signal generating means, said portion of said first sequence is formed from said pilot signal that is recorded in a center track with respect to said first magnetic head, and said portion of said second sequence is formed from said pilot signal that is recorded in a center track with respect to said second magnetic head.

13. A magnetic tape recorder according to claim 12 wherein said third signal generating means generates said third signal in accordance with a quotient formed between portions of said first and second sequences, respectively.

14. A magnetic tape recorder according to claim 13 wherein said quotient is applied, during said normal playback mode of operation, to crosstalk signal portions of said sequences that are reproduced in one of said magnetic heads but not to crosstalk portions that are reproduced in the other one of said heads.

15. A magnetic tape recorder according to claim 13 wherein said quotient is formed using an averaging technique from measurements obtained during a plurality of cycles of said magnetic heads.

16. A magnetic tape recorder according to claim 13 wherein said quotient is applied to a first difference between crosstalk signal portions of a sequence of said pilot signal that is reproduced in one of said first and second magnetic heads and wherein said misalignment error is corrected in accordance with an average value of said first difference between said crosstalk signal portions and of a difference, between crosstalk portions of a sequence of said pilot signal that is reproduced in the other one of magnetic heads.

17. A magnetic tape recorder according to claim 10 wherein said third signal generating means is responsive to a control signal for generating said third signal when said control signal is generated during an interval that occurs prior to said normal playback mode of operation.

18. A magnetic tape recorder according to claim 17 wherein said control signal is produced by an operating mode selector of said magnetic tape recorder.

19. A magnetic tape recorder according to claim 18 wherein said operating mode selector has a predetermined position selected by a user for generating said control signal in said position that causes said third signal generating means to generate said third signal.

20. A magnetic tape recorder according to claim 18 wherein said control signal is generated, automatically, every time a user selects said normal playback mode of operation.

21. A magnetic tape recorder according to claim 17 wherein said third signal is generated in a microcomputer.

22. A magnetic tape recorder according to claim 21 wherein said microcomputer includes a memory that maintains said corrective value when power is removed from said magnetic tape recorder.

* * * * *